C. R. STURDEVANT.
METHOD OF APPLYING RAIL BONDS.
APPLICATION FILED JUNE 1, 1918.

1,275,990.

Patented Aug. 13, 1918.

INVENTOR
C. R. Sturdevant
by D. Anthony Usina
his Attorney

UNITED STATES PATENT OFFICE.

CHARLES R. STURDEVANT, OF WORCESTER, MASSACHUSETTS, ASSIGNOR TO THE AMERICAN STEEL AND WIRE COMPANY OF NEW JERSEY, OF HOBOKEN, NEW JERSEY, A CORPORATION OF NEW JERSEY.

METHOD OF APPLYING RAIL-BONDS.

1,275,990.  Specification of Letters Patent.  Patented Aug. 13, 1918.

Application filed June 1, 1918. Serial No. 237,742.

*To all whom it may concern:*

Be it known that I, CHARLES R. STURDEVANT, a citizen of the United States, and resident of Worcester, in the county of Worcester and State of Massachusetts, have invented certain new and useful Improvements in Methods of Applying Rail-Bonds, of which the following is a specification.

This invention relates to the unification by welding, brazing or analogous manner of the contiguous vertical surfaces of separate metallic members such as is effected in the application to the rails of the rail bonds used in electrically connecting the abutting ends of the track rails or the third rails of electric railways. The invention more particularly relates to the application of rail bonds to the vertical surfaces of the rails of an electric railway by welding.

One object of my invention is the provision of novel means for uniting the vertical surfaces of two separate metallic members whereby the joined parts are securely welded and wherein oxidation of the consolidated surfaces is prevented in heating the separate members to the welding temperature.

Another object of the invention is the provision of an improved method of uniting separate metallic members wherein a third member or metallic body is fused and is simultaneously welded to each of the separate metallic members united by the welding operation and whereby oxidation of the joined surfaces is avoided in heating the parts in the welding operation.

Another object of my invention is to provide novel means of applying the rail bonds wherein the bonds are welded to the track rails in a rapid, substantial and economical manner, and whereby the rail bond terminals are formed concurrently with the welding operation and the difficulties ordinarily experienced in electrically welding rail bonds to the track rails are lessened and overcome.

A further object of the invention is the provision of a novel method of electrically welding rail bond terminals to the track rails having the improved series of steps hereinafter described and claimed, wherein the necessity of first forming terminals on the ends of the conductor of the rail bonds and afterward welding the terminals to the rails is avoided and made unnecessary.

Still further objects of my invention will be made apparent in the detailed description of the invention to follow hereinafter and to be particularly pointed out in the appended claims.

Figure 1:
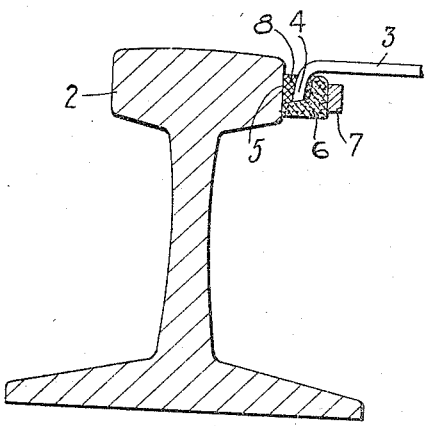

Referring now to the drawings, forming part of this specification, Figure 1 is a sectional end elevation of a track rail showing the apparatus used and illustrating the preferred manner of employing my improved method in welding rail bonds to the rails of an electric railway.

Figure 2:
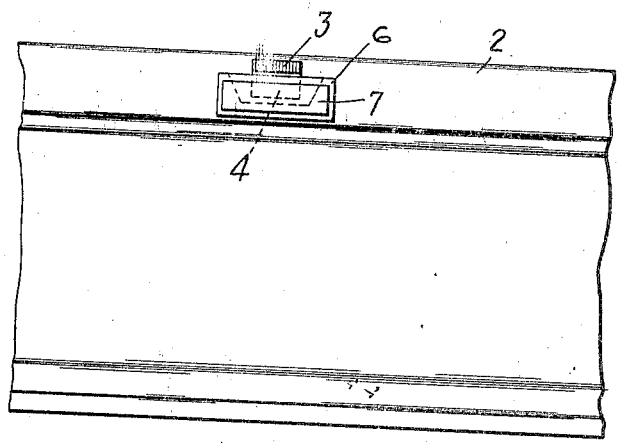

Fig. 2 is a side elevation of the apparatus shown in Fig. 1.

In the accompanying drawings, which illustrate my method as used in bonding rails, the numeral 2 designates the head of a T head track rail or third rail, and 3 is the conductor of a rail bond, this conductor being formed of laminated copper strips, or a solid rod, or preferably, as shown, of a cable or strand of copper wires.

The ductile copper conductor 3 is bent at one or both ends to the desired curvature or shape, as for example, to provide a bent end 4 in the manner shown in Figs. 1 and 2 in order to facilitate the handling of the bond in its application to the rail.

A spot on the side surface 5 of the rail head, where the bond terminal is to be applied, is cleaned to remove all scale or oxid, and a carbon mold 6 is then placed against the cleaned spot on the side surface of the rail head, the electrode 7 of a welding outfit being conveniently employed to clamp or hold the carbon mold in place.

It is to be understood that any vertical surface of the rail or other article may be utilized, instead of the vertical side of the rail head, as shown.

The mold 6 is provided with a cavity or recess which is closed at its ends and on its bottom and one side by thin walls, two of its sides, the one next to the rail and the upper one, being open as is clearly shown in Fig. 1.

The electrode 7 and the other terminal (not shown) are connected to a low voltage welding dynamo or transformer, so as to complete a circuit through the mold 6 and rail 2 when the current controlling switch of the apparatus is in closed position.

In the use of my invention in applying rail bonds to the rails of an electric railway, the bonds do not have the usual terminals on the ends of the conductor 3, the terminals 8 being formed or molded *in situ* and being formed of molten metal which is fused in the cavity of the mold 6.

After the side surface 5 of the rail has been conditioned by removing the scale or oxid at the point of application of the bond terminal, the carbon mold 6 is put in place, being clamped in position through the medium of the electrode 7. The other electrode of the welding apparatus is connected to the rail at another point in the usual known manner so as to complete an electric circuit through the carbon mold 6 and rail head 2.

The current is then turned on, being supplied, preferably, by a low voltage welding dynamo or transformer. The low voltage current passes through the carbon mold 6 to the rail 2, and thereby causes the carbon mold to become heated, the thin edges of the mold which contact with the rail becoming heated to incandescence.

A suitable fluxing material which melts when heated and which forms a heat conductor and also prevents oxidation of the metals being united, is put into the recess in the mold, additions of fluxing material being made as the flux melts in the mold 6 until the recess in the mold contains a considerable quantity of molten flux. When found necessary or desirable, the mold cavity may be entirely filled with fused flux before adding any of the metal used in forming or welding the bond terminals. The flux, while not an electric conductor at the low voltage used, is a conductor of heat, so that it serves the two-fold purpose of conducting heat to the rail head and deoxidizing the metal surfaces to be joined and molten metal that is introduced into the cavity or recess in the mold in forming the bond terminals and welding the end of the bond terminal to the rail, as will be explained.

When the current has been applied for sufficient time to cause the surface of the rail to become highly heated at the points in contact with the carbon mold 6 and between these points, (the fused fluxing material acting as a conductor of heat to the side surface of the rail opposite the cavity in the mold), the end of a rod or "pencil" of copper, brass, or other suitable metal or alloy is introduced into the molten flux within the mold. This rod rapidly melts within the cavity in the mold and being heavier than the flux, displaces the molten flux and helps to conduct heat rapidly into the head of the rail.

Instead of introducing the molten metal into the mold cavity by melting the pencil or rod, the cavity may be filled partly or completely with small pieces of metal or alloy, the pieces being mixed with or covered by the flux used.

When the cavity in the mold has become partly filled with molten metal, the end 4 of the rail bond conductor 3 is inserted in the cavity of the mold 6 and becomes rapidly heated to the temperature of the molten metal in the mold cavity. More metal is then introduced into the mold cavity by melting more of the end of a pencil or rod of such material or by adding small pieces of metal in sufficient quantities to entirely fill the mold, in the same manner as has been described.

After the mold becomes filled with the molten metal, the electric current will be cut off and in a few seconds the mold can be removed and the bond terminals formed by the molten metal will be found to be firmly united or welded to the face of the rail head and to the end of the conductor of the rail bond. Obviously, the bond terminal will have the contour or shape of the cavity in the carbon mold.

After the bond terminal has cooled sufficiently to have solidified, the conductor 3 can be bent as is found necessary or desirable, so as to cause it to extend horizontally or vertically, as required.

The other end of the conductor of the rail bond is then united to the head of the abutting rail and provided with a terminal in the same manner as has been described.

The advantages of my invention, which will be apparent to those skilled in the art, arise from the use of a carbon electrode through which the current passes, having a thin lip in contact with the surface of the rail at the point of application of the rail bond terminal to the rail, and in avoiding the necessity of applying heat and pressure in forming the weld between the rail bond terminal and rail.

The operation is under better control than is possible with the methods of applying rail bonds heretofore used. The use of the molten flux in the manner described prevents oxidation of the metal surfaces being united, while a material decrease in the amount of electric power used is effected.

Various modifications in the method, which will readily suggest themselves to those skilled in the art, may be made without departing from my invention as defined in the appended claims. The vertical surfaces of any two metal members can be readily united or welded by the steps of my improved method. Both ends of a rail bond conductor may be applied simultaneously by employing two carbon molds placed in series so that the current used will simultaneously heat both molds, or the molds for the opposite ends of the rail bond conductor.

I claim:—

1. The method of uniting separate metallic members which consists in applying a carbon mold to the surface of one member, electrically heating the mold and opposite surface of the member in contact therewith, adding a fusible flux to the mold cavity to prevent oxidation of the heated surface of said metallic member and assist in the conduction of heat thereto, fusing metal within the mold cavity and thereby displacing the molten flux, inserting an end of the second metallic member in the molten metal within the mold cavity, and then permitting the parts to cool, and thereby welding said separate metallic members.

2. The method of bonding rails which consists in applying a carbon mold to the rail at the point of attachment of the bond terminal, electrically heating the mold and opposite surface of the rail, fusing metal in the mold cavity, adding a fusible flux to prevent oxidation of the heated rail surface, inserting an end of the bond conductor in the molten metal within the mold cavity, and then allowing the parts to cool and thereby uniting the rail and conductor.

3. The method of bonding rails which consists in applying a carbon mold to the rail at the point of attachment of the bond terminal, electrically heating the mold and opposite surface of the rail, adding a fusible flux to the mold cavity to prevent oxidation of the heated surface of the rail, fusing sufficient metal in the mold cavity to form a bond terminal, inserting the end of a bond conductor within the molten metal in the mold cavity, and then allowing the parts to cool, and thereby simultaneously forming the bond terminal and uniting the rail and conductor to the terminal.

4. The method of bonding rails which consists in applying a carbon mold to the rail at the point of attachment of the bond terminal, heating the mold and adjacent rail surface, adding a fusible flux within the mold cavity to aid in heating the rail surface opposite the mold cavity and prevent oxidation thereof, fusing metal in the mold cavity and thereby displacing the fused flux with sufficient molten metal to form a bond terminal, inserting an end of the bond conductor in the molten metal and permitting the heated parts to cool, and thereby simultaneously forming the bond terminal and uniting the terminal, rail and bond conductor.

5. The method of bonding rails which consists in applying a carbon mold to the rail at the point of attachment of the bond terminal, electrically heating the mold and adjacent rail surface, supplying a fusible flux within the mold cavity, and thereby preventing oxidation of the heated rail surface and aiding in heating the rail, displacing the molten flux with sufficient molten metal to form a bond terminal by melting metal in the mold cavity, inserting the end of a bond conductor in the molten metal within the mold cavity and then permitting the heated parts to cool and thereby simultaneously forming and uniting the terminal to the rail and an end of the conductor.

6. The method of bonding rails which consists in applying a carbon mold to the rail at the point of attachment of the bond terminal, electrically heating the mold and contacting surface of the rail, melting a fusible flux within the mold cavity to thereby prevent oxidation and assist in conducting heat from the mold to the rail, fusing metal in the mold cavity and thereby displacing fused flux in supplying molten metal in the mold cavity, inserting an end of the bond conductor in the molten metal, allowing the molten metal to solidify and thereby attach the bond conductor to the rail, and then removing the carbon mold.

7. The method of bonding rails which consists in applying a carbon mold to the rail at the point of attachment of the bond terminal, electrically heating the mold and contacting surface of the rail, melting a fusible flux within the mold cavity to thereby prevent oxidation and assist in conducting heat from the mold to the rail, fusing metal in the mold cavity and thereby displacing fused flux within the mold cavity in supplying molten metal to form the bond terminal, inserting the end of the bond conductor in the molten metal, fusing additional metal sufficient to fill the mold cavity and complete the bond terminal, and then allowing the metal to cool and solidify and thereby form a terminal attaching the bond conductor to the rail, and then removing the carbon mold.

8. The method of bonding rails which consists in applying a carbon mold to the rail at the point of attachment of the bond terminal, electrically heating the mold and contacting surface of the rail and raising the temperature of the mold to incandescence in the heating operation, melting a fusible flux within the mold cavity to thereby assist in conducting heat from the mold to the rail, fusing a metal pencil in the mold cavity and thereby displacing fused flux therein, inserting the end of the bond conductor in the molten metal within the mold cavity, and then allowing the molten metal to cool and solidify and thereby weld the bond conductor to the rail, and then removing the carbon mold.

In testimony whereof, I have hereunto set my hand.

CHARLES R. STURDEVANT.